United States Patent
DeCia et al.

(10) Patent No.: US 10,613,219 B1
(45) Date of Patent: Apr. 7, 2020

(54) VEHICLE PARKING ASSISTANCE FOR AVOIDING CONTACT WITH GARAGE DOORS

(71) Applicant: FORD GLOBAL TECHNOLOGIES, LLC, Dearborn, MI (US)

(72) Inventors: Nunzio DeCia, Northville, MI (US); David M. Herman, Southfield, MI (US); Stephen J. Orris, Jr., New Boston, MI (US); Nicholas A. Scheufler, Flat Rock, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/150,615

(22) Filed: Oct. 3, 2018

(51) Int. Cl.
  *G01S 13/931* (2020.01)
  *E05F 15/77* (2015.01)
  *E05F 15/73* (2015.01)
  *B60J 5/10* (2006.01)

(52) U.S. Cl.
  CPC ............ *G01S 13/931* (2013.01); *B60J 5/102* (2013.01); *E05F 15/73* (2015.01); *E05F 15/77* (2015.01); *E05F 2015/767* (2015.01); *E05Y 2900/106* (2013.01); *E05Y 2900/532* (2013.01); *E05Y 2900/546* (2013.01); *G01S 2013/9314* (2013.01); *G01S 2013/93272* (2020.01)

(58) Field of Classification Search
  None
  See application file for complete search history.

(56) References Cited

U.S. PATENT DOCUMENTS

| 7,643,927 | B2 | 1/2010 | Hils | |
|---|---|---|---|---|
| 9,663,981 | B2 | 5/2017 | Conner et al. | |
| 9,922,548 | B2 | 3/2018 | Geerlings et al. | |
| 2012/0154591 | A1* | 6/2012 | Baur | B60R 1/00 348/148 |
| 2014/0118111 | A1* | 5/2014 | Saladin | E05F 15/77 340/7.51 |
| 2015/0232027 | A1* | 8/2015 | Freitas | B60Q 9/008 340/435 |
| 2015/0302737 | A1* | 10/2015 | Geerlings | G08C 17/02 340/5.25 |

(Continued)

FOREIGN PATENT DOCUMENTS

DE    102014213270 A1    1/2016

*Primary Examiner* — Daniell L Negron
(74) *Attorney, Agent, or Firm* — Frank L. Lollo; MacMillan, Sobanski & Todd, LLC

(57) ABSTRACT

Driver assistance is provided for parking a vehicle inside a garage with a powered garage door actuating system. During parking of the vehicle in the garage, remote scanning is performed around the vehicle to detect a path of a garage door. While in the parking mode, the garage door path is compared to a vehicle profile. Driver guidance is provided in order to locate the vehicle where the profile and path are non-interfering. In a parked mode, the door is monitored for actuations, and the garage door actuator is automatically commanded to reverse if the actuator is closing the door toward an interfering position with the profile. The vehicle profile may encompass an expansion zone recurrently occupied by a powered vehicle door or tailgate. If the interfering position coincides only with the expansion zone then the command to reverse the actuator is made only if the tailgate is not closed.

10 Claims, 6 Drawing Sheets

(56) References Cited

U.S. PATENT DOCUMENTS

2016/0368489 A1\* 12/2016 Aich ................ B60W 30/06
2017/0175433 A1\* 6/2017 Kang ................ E05F 15/77
2017/0268280 A1 9/2017 Kim \* cited by examiner

VEHICLE PARKING ASSISTANCE FOR AVOIDING CONTACT WITH GARAGE DOORS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to parking guidance in a garage with a powered door closure, and, more specifically, to automatic intervention when a collision between a vehicle and a powered garage door is predicted.

A typical automatic garage door opener has a single optical sensor at the base of the door to detect an obstruction in the pathway of the door during closure. The positioning of the sensor is adequate for detecting a person, pet, or other objects in the path of the garage door which is on or close to the ground surface. Such a sensor is less reliable for detecting a protruding vehicle which has been parked in such a way that the rear tires are outside the detection zone of the optical sensor but the rear bumper or a tailgate of the vehicle is still in the pathway of the garage door. Attempting to close the door in such a scenario can cause the garage door to scrape against the vehicle, causing damage to the body and paint of the vehicle even if the door opener ultimately reverses the closure once resistance from the obstruction is detected.

Garage parking assistance systems are also known which detect when the vehicle has pulled sufficiently far into the garage based on a preset distance from the front of the vehicle a front wall or other landmark in the garage. These systems usually require manual calibration and may be difficult to install. They are also subject to failure modes wherein obstructions in the garage can cause false positives or false negatives. Furthermore, they can only detect the vehicle position and inform the driver of clearance. They can take no further action when a proper parking location is not achieved and the garage door is subsequently closed.

Recent trends have been for vehicle outer dimensions to increase and for the size of the rotation path traversed by an opened tailgate to increase. Thus, the clearance between the path of the garage door and the space occupied by an open tailgate becomes increasingly limited. Therefore, it would be desirable to improve guidance during parking in a garage to avoid interference between any part of a vehicle (including an open tailgate) and an automatic garage door, and to automatically prevent collisions if a vehicle is parked in a position that remains subject to the possibility of an impact by the garage door.

SUMMARY OF THE INVENTION

In one aspect of the invention, a road vehicle comprises a remote sensor configured to scan a region outside the vehicle to detect a garage door path relative to the vehicle. A human machine interface (HMI) is configured to provide messages to a user. A controller has 1) a parking mode which compares the garage door path to a vehicle profile and 2) a parked mode which monitors a closure status of the garage door. A garage door remote controller is configured to transmit actuation commands to a predetermined garage door opener. During the parking mode, the controller initiates navigation messages via the HMI to assist the user in moving the vehicle to a location where the profile and the garage door path are non-interfering. During the parked mode, the controller initiates an actuation command if the closure state indicates that a garage door closing along the garage door path is approaching an interfering position with the vehicle profile.

DETAILED DESCRIPTION OF PREFERRED EMBODIMENTS

Figure 1:
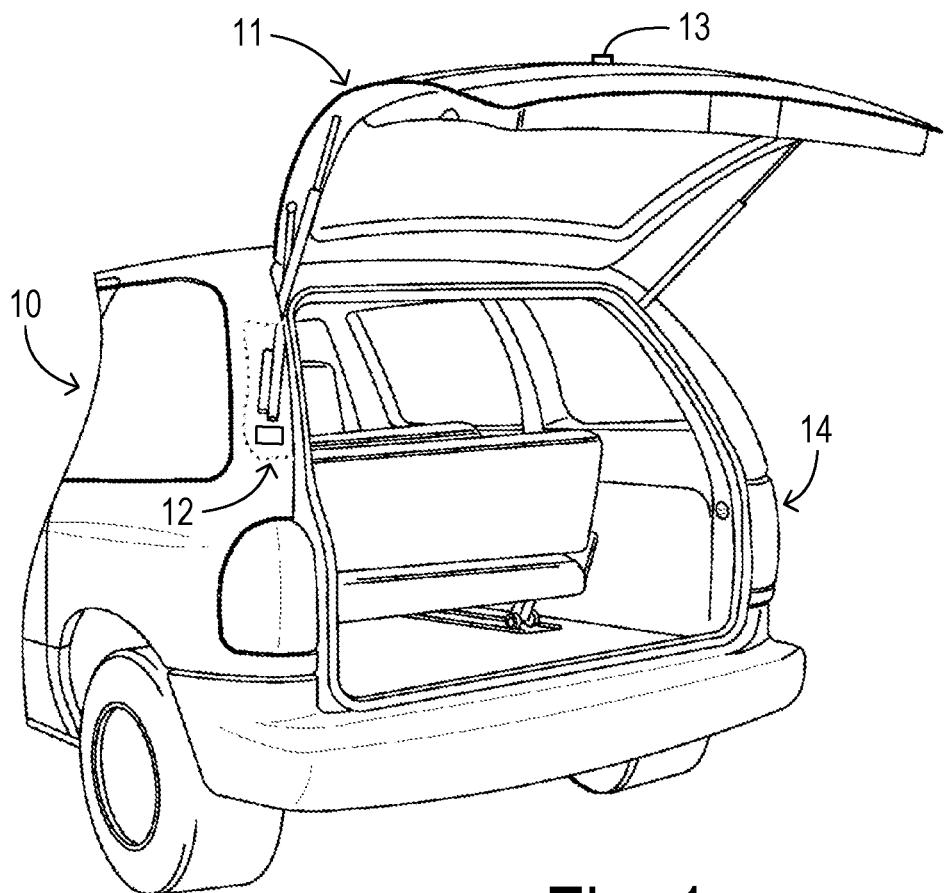
FIG. 1 is a rear, perspective view showing a vehicle with an opened tailgate.

The invention uses vehicle cameras and/or other remote sensors to guide the driver and inform the driver of detected garage door clearance during a parking maneuver into a garage. A garage door closure event is automatically detected through image and audio signal processing, and the closure of the door can be automatically reversed using an integrated universal garage door opening remote when necessary to prevent damage to the vehicle.

Many vehicles are equipped with rear view cameras as part of compliance with federal regulation FMVSS 111. Such a backup camera can be used to obtain images for use as input to image processing algorithms to detect elements of a garage including walls, a garage door, garage door opening, and a path traversed by the garage door between its opened and closed positions. Many vehicles are also equipped with an integrated universal garage door opening system (e.g., HomeLink from Gentex Corporation), which would facilitate automatically reversing the closure of a garage door prior to any contact with a vehicle in the pathway of the door (assuming that the transmitter of the opening system has previously been programmed to operate the garage door in question). Moreover, the image processing system together with a human-machine interface (HMI) can provide guidance to the driver when positioning the vehicle in the garage relative to the garage door path in order to achieve sufficient frontward and/or rear clearance to accommodate opening of the vehicle tailgate. As used herein, tailgate includes any powered or manual closures of a road vehicle such as a hatchback, liftgate, sliding door, or other devices that recurrently extend outwardly from the vehicle when opened.

For improved accuracy and increased use-case scenarios, additional remote sensors such as forward facing cameras, side mirror cameras, truck bed cameras, radar sensors, ultrasonic sensors, and others could be used (i.e., sensor fusion). HMI notifications to alert the driver that the vehicle has not yet cleared the pathway of the garage door or to guide the driver to an acceptable position may be produced using an in-vehicle display (e.g., an instrument panel display or a navigation system display). An alert notification could be triggered upon the driver shifting a transmission gear selector into the Park position, with the alert being escalated to an audible alert chime or warning once the driver turns the ignition key to the Off position (or presses the "Push To Start" button to turn off the vehicle). Additionally, if the vehicle infotainment system is paired to the driver's mobile device (e.g., smartphone or a wearable such as a smart watch), an alert could be queued up and sent to the mobile device in the event the vehicle turns off without the driver having first moved the vehicle a location providing a clear pathway. The supplemental alert could continue for 30 seconds or until manually dismissed by the driver.

During parking or once the vehicle is parked without a clear pathway, the invention monitors for initiation of the garage door closing mechanism in order to take preventive action. Initiation of a closing of the garage door is easily detected when the driver uses the universal transmitter in the vehicle to send a command. However, a closing command may often be initiated with other remote control devices such as a wall-mounted keypad or pushbutton. An in-cabin microphone is often available in a vehicle which may be used for voice recognition, hands-free calling, or active noise cancelling. With audio signal processing using external sounds picked up by the microphone, it is possible to recognize when a garage door "closure event" has commenced. The typically loud operation of a garage door opener in the opening or closing phase of operation provides a good "signature" that would be easily recognizable. Accuracy can be improved using adaptive learning after multiple events tied to the same location (e.g. by GPS localization). Door closure can also be detected using camera images. Furthermore, optical and audio sensing can be combined for even more reliability when detecting a closure event.

A controller system of the invention may map the garage where it is being parked using a combination of camera(s) and other sensors to understand the geometry of the garage. Using predetermined data representing a vehicle profile defining bounding dimensions of the vehicle (with and without the tailgate open), the controller localizes a vehicle profile within the garage. If the vehicle is equipped with the integrated opener transmitter and if alerts indicating an unclear pathway were ignored prior to the driver exiting the vehicle, a command to reverse the closure of the garage door is sent upon a detection of a closure event. If interference between the vehicle position and the door pathway only exists if the tailgate is open, then reversal may be dependent upon whether the tailgate is not closed. To maintain efficient use of system resources, parking guidance and monitoring of potential collisions involving the garage door may be activated only at a particular geographic location (e.g., the driver's home).

Accurate detection of when the vehicle has completely cleared the pathway of the garage door is needed for effective operation of the invention. Images from a single rear view camera is sufficient under many circumstances. Additional cameras or other remote sensors may also be desirable. A controller with appropriate software/firmware would access data concerning the vehicle dimensions, camera position, perspective, image field of view (FOV) relative to the vehicle, and other details in order to analyze a situation. When the vehicle is entering a garage, visual Simultaneous Localization and Mapping (SLAM) and/or various object detection procedures may be used to identify key features of the garage indicating the distance of the vehicle relative to various features of the garage. Such visual features may include the garage floor and driveway demarcation based on color or other visual cues (e.g., rise, depression, or discontinuity in the pavement). In some cases, where the demarcation is not visible from the final parking position of the vehicle but is visible earlier during entrance into the garage, then dead-reckoning of a travel distance from the last visible position may be recorded to determine the vehicle position relative to the demarcation. This would be especially useful in cases where a forward facing camera is used. In the simplest and most common case, a garage door demarcation line can be detected on the floor. This further provides knowledge of any skew in the angle of the vehicle from being aligned with a garage door track. Specifically, given knowledge of the camera FOV and camera perspective, the angle of the demarcation relative to a vehicle longitudinal axis can be established. Thereafter, it is a simple geometric calculation to determine the minimum horizontal distance from the demarcation to the vehicle given the camera height. In cases where the demarcation is unclear, performance can be improved if the user places a visually observable paint or colored adhesive tape along an edge of the door.

An alternative method that can be used if the garage door demarcation line on the floor is poorly visible uses fixed objects within the garage to determine the garage door pathway, such as the garage door track. The track is often reflective due to their metallic composition, and typically stand out from their surroundings. In the event that their appearance causes them to blend in with their surroundings, they could also be painted in a particular high-contrast color or optical pattern (e.g., striped) or tagged with infrared reflective tape. Since the camera hardware is fixed for any particular vehicle and the mounting location is likewise fixed, an corresponding algorithm can be developed based on the FOV of the camera and detection of the garage door rails in the camera images, resulting in a high confidence determination of the vehicle distance from the garage door closure position and whether the vehicle has fully cleared the pathway of the door. Clearance for opening a tailgate can also be detected by including an expansion zone in the vehicle profile to encompass the geometry of the open position of the tailgate. In order for a rear facing camera to support these capabilities, a horizontal FOV of the camera should be above some threshold (e.g., at least 178°) for a vehicle centered in the space of a 2-car garage when parked at a minimum clearance location. The threshold for clearance would also account for cases where the tailgate was left open and is now in the pathway of the garage door. This type of detection can also assist in guiding the user to pull far enough forward to provide adequate clearance if they plan to open their tailgate. A corresponding HMI notification, may preferably be limited to instances where there is high confidence of relevance to the user based on context. For example, a notification should usually only be triggered when a determination can be made that the user is pulling into their home garage. It could also be required that the event occurs after a journey that began with a tailgate opening event (e.g., at a grocery store or other store) to show a likelihood that the user will want to open the tailgate. Relevant locations could be learned over time to weight the confidence of a prediction that the tailgate would be reopened upon arrival to the user's home. Such a notification could also be displayed on a user's mobile or wearable device if a tailgate opening event occurred after the vehicle was shut off.

It may also be desirable to utilize a forward facing camera in combination with visual SLAM and knowledge of the vehicle path when entering the garage. This would allow mapping of the physical dimensions of the garage while pulling in and determination of present vehicle position. The location of the garage door closure may be estimated from the exterior wall of the garage structure when entering. There generally may also be other visual clues to determine the specific distance the garage door closes relative to the exterior wall of the opening.

Some compensation for yaw would be factored in to correct for misalignment if the vehicle was pulled in off-axis. This situation would be evident based on the perspective captured by the rear facing camera (or other sensors) as the vehicle pulls into the garage. If additional cameras are equipped on the vehicle, a correction factor can be determined based on camera perspective. A vehicle equipped with ultrasonic sensors on the rear bumper would improve the accuracy to compensate for off-axis parking even further.

If the presence of a trailer hitch is detected by the rear-view camera, then approximation of the length of the hitch may be desirable to properly determine adequate clearance from the pathway of the door. In some cases, bicycles, cargo storage, or other objects may be mounted on the vehicle's hitch, thereby blocking a portion of the image. These objects may be recognized by image analysis such as neural network trained to detect bicycles, cargo carriers, or other relevant objects. Image analysis to differentiate between obscured and unobscured pixels may include a pixel-wise segmentation process based on a convolutional neural network (CNN). Unobscured pixels may then be used for detecting the garage door or other features. When determining clearance for a parking position, the vehicle profile can be further expanded according to an estimated size of the objects. Alternatively, the user may manually enter the added distance for use later.

As already mentioned, sensor fusion may be used to augment and improve the reliability and accuracy of the invention. For example, a user may prefer backing into the garage. In such a case, a forward looking camera may be the primary remote sensor, or visual SLAM may be used with the rear facing camera instead.

In cases where sensor fusion permits, a guidance to the user could be provided to optimally center the vehicle in their garage to provide equal distance both in front and behind the vehicle. This can be helpful if the user desires the ability to pass both in front of and behind the vehicle with the garage door closed.

Referring now to the drawings, FIG. 1 shows a vehicle 10 with a tailgate 11. A powered actuator 12 includes a motor and a movable support arm. A driver control button (not shown) and/or a wireless fob (not shown) can be used to operate actuator 12 to successively open or close tailgate 11. A rear-facing (e.g., backup) camera 13 is mounted to tailgate 11. When tailgate 11 is closed then camera 13 provides a field of view useful for monitoring the progression of vehicle 10 into a garage as well as detecting garage door structures (e.g., a garage door track and/or movable door panels) to identify a door position and/or an opening/closing path of the garage door. A camera and/or other remote sensors can also be integrated in a lighting assembly 14 or placed in other areas around vehicle 10.

Figure 2:
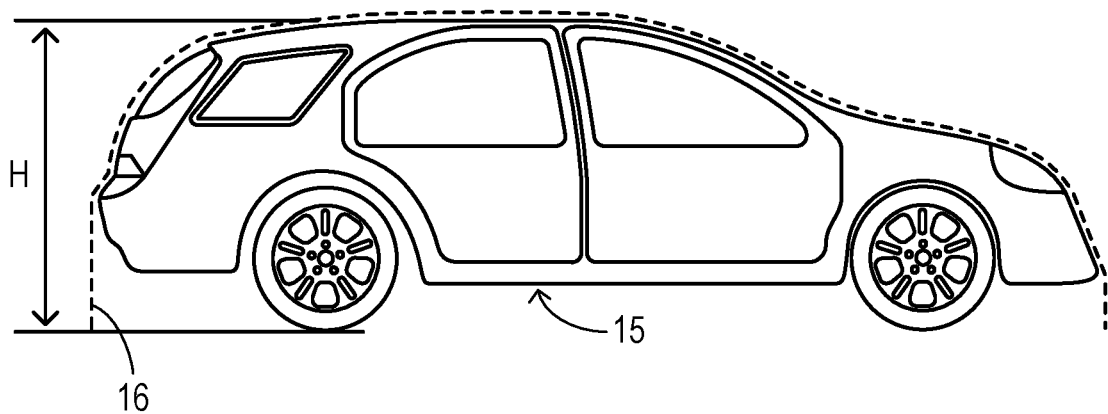
FIGS. 2 and 3 are side views showing a vehicle profile with a tailgate in a closed and an opened state, respectively.
Figure 3:
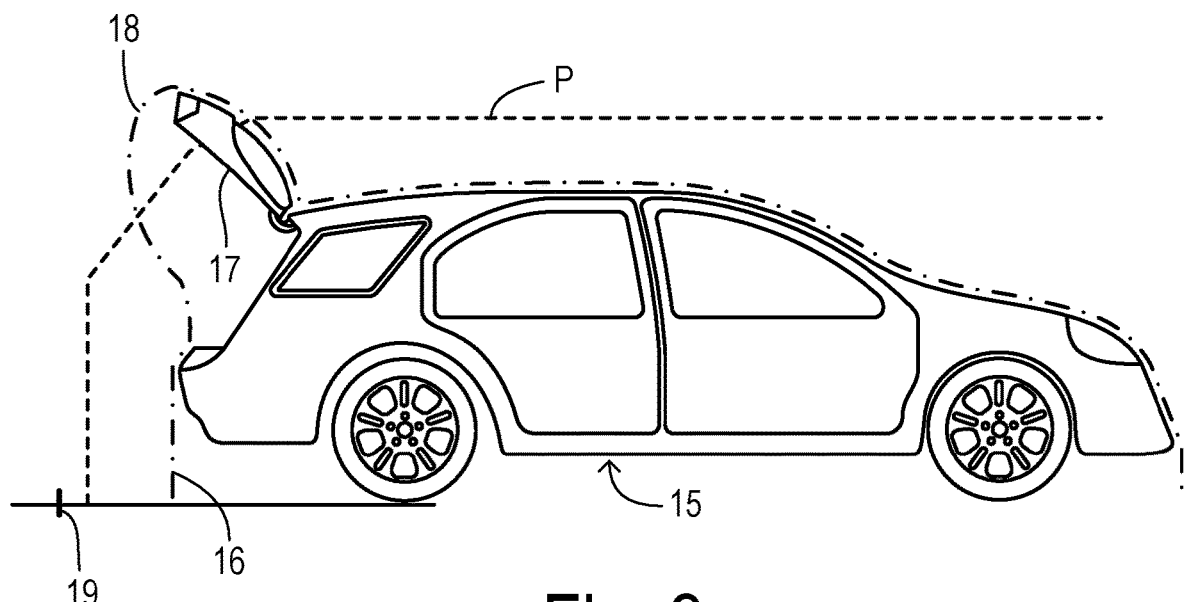

When the tailgate is open as shown in FIG. 1, a possibility of impacting a garage door (whether the garage door is already closed or in the act of closing) is increased because of the additional space occupied by the vehicle. As shown in FIG. 2, a vehicle 15 has a vehicle profile 16 which encompasses the dimensions of vehicle 15 including a vehicle height H. For simplicity, vehicle profile 16 may be represented within an electronic controller as a geometric bounding box or polyhedron as an approximation of the curving surfaces along the top, sides, front, and back of vehicle 15. Vehicle 15 has a tailgate 17 which expands the outer envelope of vehicle 15 as shown in FIG. 3. Thus, an expansion zone 18 may be added to vehicle profile 16 to encompass all the incremental positions of tailgate 17 from closed to fully open.

When parking vehicle 15 in a garage, interaction with a path P of an automatic (i.e., power operated) garage door becomes a potential problem. A demarcation line 19 on a garage floor indicates a point of entry into the garage or another feature associated with the layout or structural elements in a garage, such as a rail track or other element which makes it possible to infer the corresponding trajectory of path P relative to the position of the vehicle profile. As shown in FIG. 3, vehicle 15 is insufficiently advanced beyond demarcation line 19 to avoid an interfering condition between door path P and vehicle profile 16 with its expansion zone 18. In certain embodiments of the invention, a driver is alerted to any potential interference between the tailgate and the garage door and given guidance for pulling ahead within the garage to a final parking position, and automatic action may be taken to reverse a door movement if an open garage door was to be commanded to close with tailgate 17 in the interfering position after the vehicle is parked.

Figure 4:
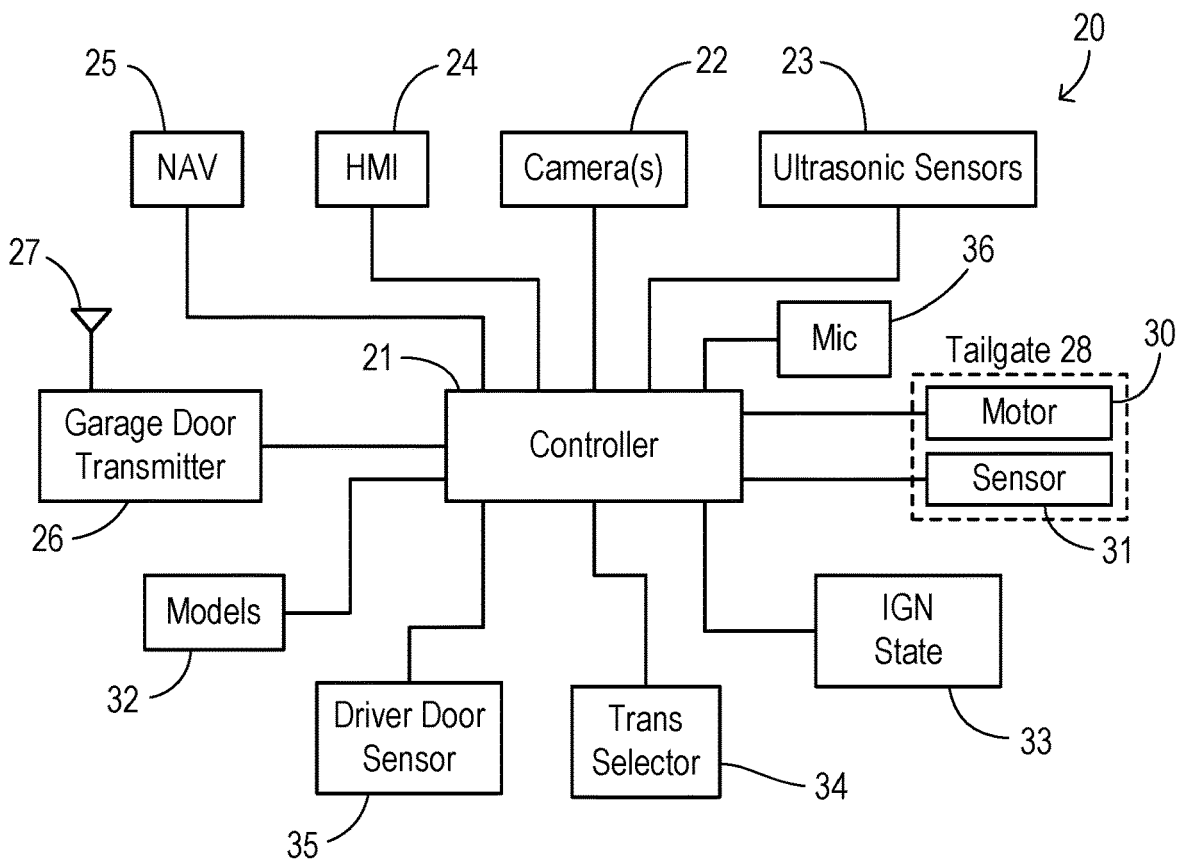
FIG. 4 is a block diagram showing one embodiment of a vehicle configuration for performing the present invention.

FIG. 4 shows an embodiment of a vehicle system 20 in accordance with the present invention wherein a controller 21 performs various processing functions. Camera(s) 22 which typically includes a rear-facing backup camera are connected to controller 21 to supply images or other remote sensing data by scanning a region outside the vehicle to detect the garage door path relative to the vehicle. In addition to optical cameras, the remote sensors may also include ultrasonic sensors 23, radar sensors, or laser sensors (not shown).

A human machine interface (HMI) 24 is connected to controller 21 in order to provide messages to a user (e.g., the driver). HMI 24 may include a vehicle instrument panel message center or mobile devices such as a smart phone or smart wristwatch in order to communicate with the user inside and outside of the vehicle. Controller 21 is connected to a navigation system 25 which may collect data on vehicle geographic coordinates and movements, and may also be used to provide instructions to the user. Remote control of a power-actuated garage door is provided by garage door transmitter 26 and antenna 27 mounted on the vehicle. Transmitter 26 is connected to controller 21 in order to enable controller 21 to issue reversal commands for automatically controlling the garage door and to obtain notifications from transmitter 26 when the user initiates a garage door closing command from within the vehicle (e.g., by pushing a control switch on transmitter 26).

Controller 21 is coupled to a tailgate system which includes a motor 30 and a tailgate sensor 31. Tailgate sensor 31 is connected to controller 21 in order to facilitate monitoring of the open or closed state of the tailgate. The connection between motor 30 and controller 21 can be used to enable controller 21 to detect when an opening action has been manually initiated for the tailgate, which can then be followed by checking for a potential interference condition between the tailgate and the current state of the garage door. If a potential collision is indicated, then a warning message can be presented to the user and/or automatic action can be taken to open (or reverse the closing of) the garage door. Alternatively or additionally, the opening of the tailgate could be automatically reversed by using the connection between controller 21 and motor 30 to issue a closing command to the tailgate.

Controller 21 includes a memory 32 for storing geometric models for the vehicle profile as well as models or other data corresponding to garage door paths and garage features useful for pinpointing the relative location of the garage door path. The stored data may include customized data that is specific to the particular user (i.e., data characterizing the particular garage layout and door installation) or may include generic data adapted to accommodate the most typical garage door layouts, for example.

In order to determine when a driver has completed a parking operation, controller 21 may further be connected to receive an ignition state from an ignition switch 33, a gear position from a transmission selector 34, and a driver door position from a driver door sensor 35. A preferred embodiment operates in a "parking mode" for guiding the driver to reaching a "clear" location where there is no interference between the garage door and the vehicle. The parking mode extends until the driver exits the vehicle with the vehicle in Park and the engine Off, whereupon it operates in a "parked mode." The parked mode is adapted to react to potential garage door operations which may result in an interfering condition between the vehicle profile and the garage door.

Controller 21 is further connected to a microphone 36 (which may be part of a speech recognition system or a handsfree phone system of the vehicle. In the present invention, microphone 36 can be used for detecting that a garage door actuator has begun to close the garage door. Preferably, the use of sound emitted by the closing of the garage door is one of several concurrent methods for detecting a closure event so that automatic override of the closure of a garage door can be done reliably. In-cabin microphone(s) 36 can be used to sample audio continuously during the parking of the vehicle in the garage, and signals from microphones 36 are processed to recognize when the distinctive sound of the garage door opener is in operation. Once the garage door opener sound is detected, it may be desirable to detect (or confirm) the direction of door travel. Thus, rear-facing camera images are analyzed. If the images show that the door is blocking the view, it is assumed that the door is currently in the closed position and in the process of being opened. If the optical recognition process recognizes that the view is not blocked, it is assumed that the door is currently open and in the process of being closed (i.e., a "closure event" is detected). Once the "closure event" is detected with the vehicle or the tailgate in an interfering position, then a command to reverse the closure of the door opener back toward the "open" position is transmitted by the integrated universal garage door remote control system. Concurrently, an HMI notification is sent to a mobile or wearable device or to a vehicle display in order to alert the user that the action taken by the vehicle, and to remind them to move the vehicle to a position with a clear pathway and to try closing the garage door again.

Figure 5:
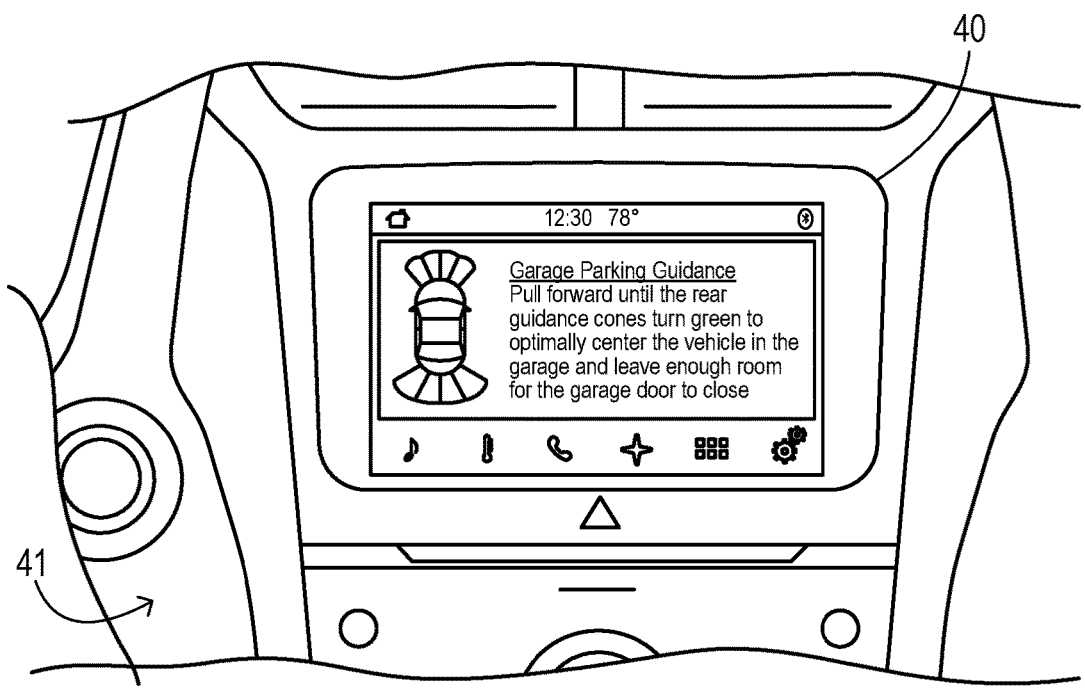
FIG. 5 is a plan view showing a human machine interface (HMI) displaying a guidance message.

FIG. 5 represents a guidance message presented to a driver while in parking mode using a central display screen 40 on an instrument panel 41. Using various remote sensors to monitor the relative positions of the vehicle, the garage door path, and other structures in the garage, the status of various clearances around the vehicle can be interactively displayed to allow the driver to achieve an intended parking result.

Figure 6:
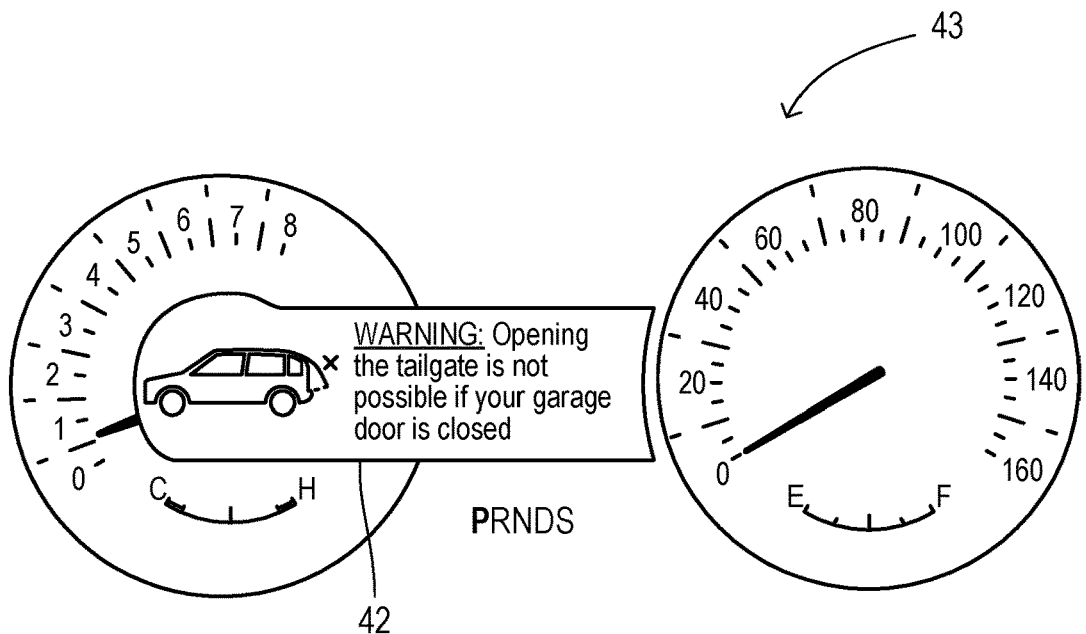
FIG. 6 is a plan view showing a human machine interface (HMI) displaying an alert message.
Figure 7:
FIG. 7 is a plan view showing another human machine interface (HMI) displaying an alert message.

FIG. 6 shows an alert message 42 (i.e., warning message) displayed on an instrument cluster display 43. Alert message 42 is generated when the driver performs actions indicating that they may be preparing to turn off the vehicle and exit the vehicle without having achieved a parking location that avoids interference between a garage door and an open tailgate. For example, shifting of a transmission gear selector to a Park position may result in the triggering of alert message 42. FIG. 7 shows another alert message 44 displayed on a smart wristwatch 45. Message 44 informs a user that an attempt to close the garage door was reversed to avoid a collision between the garage door and the vehicle.

Figure 8:
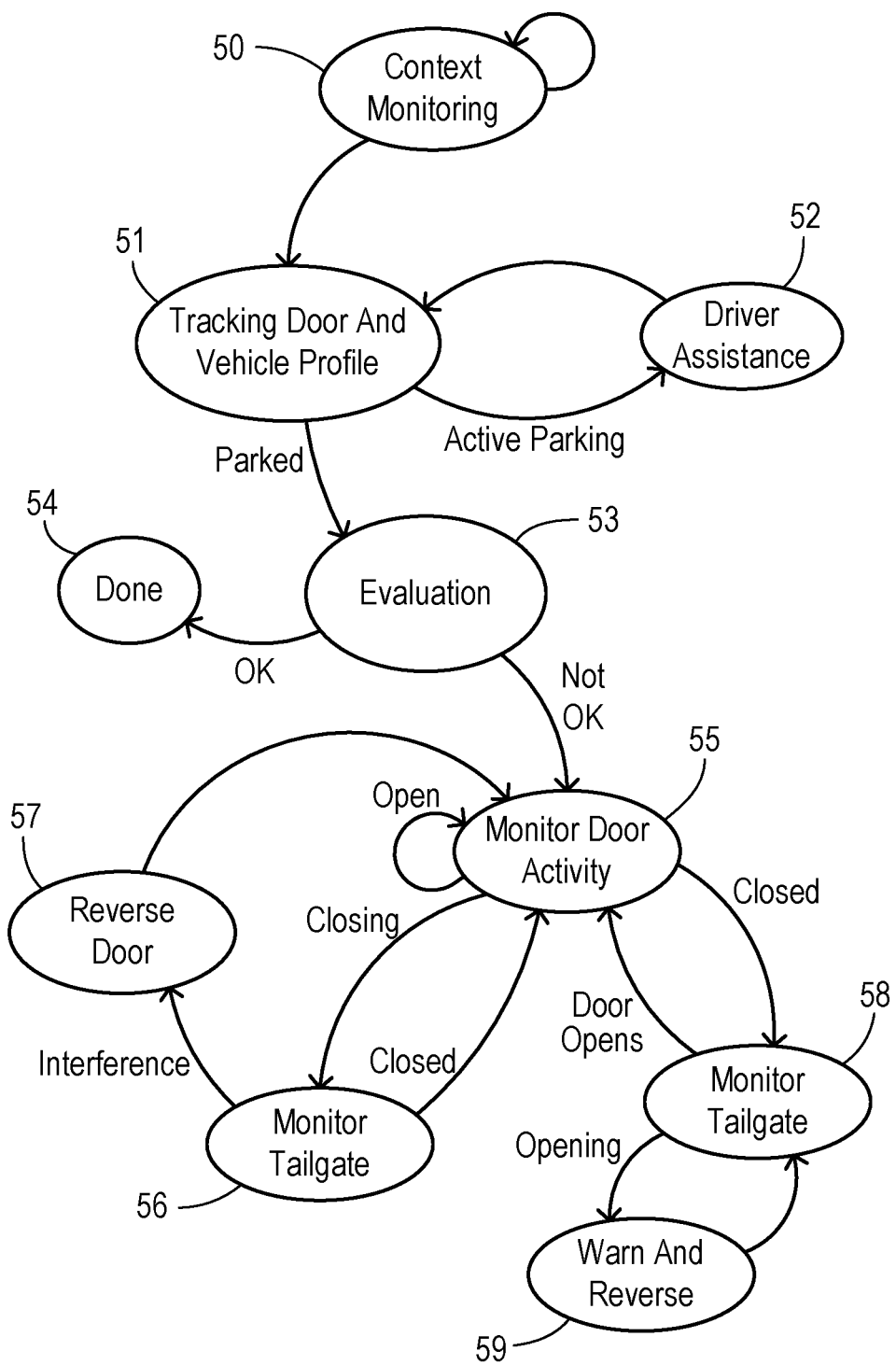
FIG. 8 is a state diagram showing one preferred process of the invention.

FIG. 8 shows a state diagram according to one embodiment for operating of a control system of the present invention. In state 50, monitoring of various vehicle parameters is performed to identify an operating context for each moment that the vehicle is being driven. Specifically, state 50 detects a time when the vehicle is being parked in a user's garage (e.g., based on GPS coordinates and image recognition wherein camera images are compared to stored images of structures of the user's garage). When state 50 detects that the vehicle is entering the predetermined garage, then a transition is made to state 51 and the control system begins operating in a parking mode. In state 51, camera images and/or other remote sensing data are used to track the door/doorpath position relative to the vehicle and to compare the recognized garage door and/or path to a vehicle profile. During the active parking mode, driver assistance instructions and displays are provided to the driver at a state 52. State 52 may inform the driver when they have achieved a position in which garage door operation does not interfere with the vehicle profile. Separate indications may be made with respect whether the clearance is achieved for the vehicle profile with the tailgate closed or whether clearance includes the case where the tailgate is opened. For instance, a driver might already know that there will be no need to open the tailgate and therefore is willing to park in a position where clearance is only available as long as the tailgate remains closed.

When the vehicle becomes parked (e.g., the driver is exiting the vehicle and the vehicle has been shut off), then a transition is made to state 53 and a parked mode begins. In state 53, the clearance between the vehicle profile and the garage door path is evaluated. If clearance is available under all circumstances, then the transition is made to state 54 where the process completes and no further action needs to be taken. If a potential for interference between the vehicle profile and the garage door path does exist, then a transition is made to state 55 where the control system monitors for garage door activity. As long as the garage door remains open, then the process continues to monitor for activity in state 55. If a closing event is detected, then the controller transitions to state 56 which checks for the type of interference condition that is present.

In state 56, if the interference condition exists for the vehicle profile even with the tailgate closed then a transition is made to state 57 which initiates an actuation command to the garage door remote controller that reverses the door actuator so that the garage door no longer approaches an interfering position with the vehicle profile. If the interference condition exists only with the expansion zone of the vehicle profile for encompassing an opened tailgate, then state 56 monitors for a closure state of the tailgate. If the tailgate is closed, then no collision will occur and a return may be made to state 55. If the tailgate is not closed (i.e., is opening or already fully open), then a transition is made to state 57 which initiates an actuation command to the garage door remote controller that reverses the door actuator. After reversing the door actuator, the controller returns to state 55.

In state 55 of the parked mode, if the garage door is already fully closed then the tailgate is monitored in state 58. The closure state of the tailgate is Close when entering state 55. If a user manually activates a powered opener of the tailgate while there is insufficient clearance for it to open without contacting the closed garage door, then a transition is made to state 59 where the user is given an alert message to inform them that a collision would occur upon opening. In addition to the warning, state 59 may also take automatic action to mitigate or avoid a collision by reversing the powered actuator of the tailgate to maintain the tailgate in a closed position or by initiating an actuation command to the garage door remote controller that activates the door actuator to open the garage door if sufficient clearance is available at the opened position of the garage door. If the garage door opens, then a transition is made back to state 55.

Figure 9:
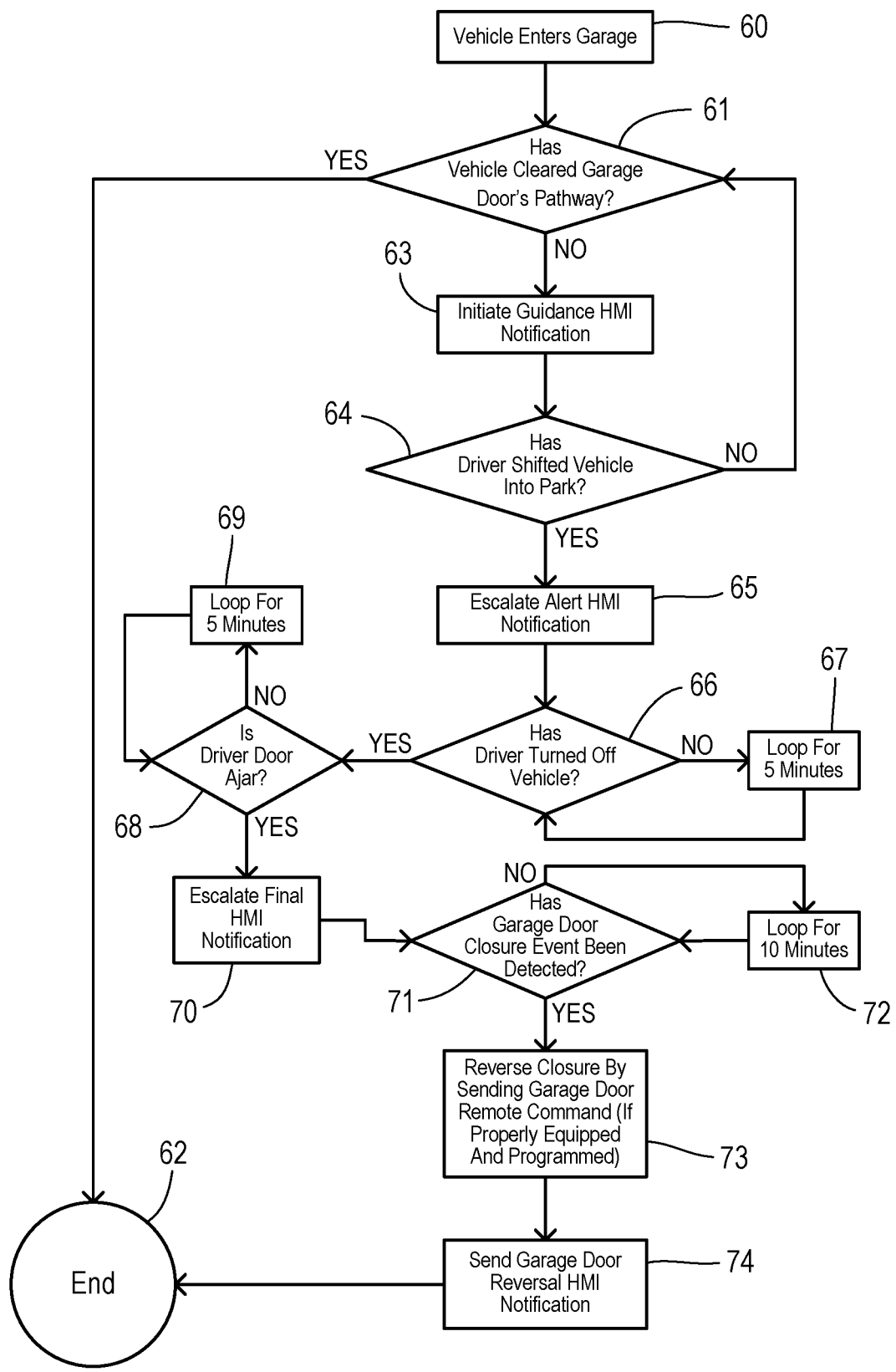
FIG. 9 is a flowchart showing another preferred method of the invention.

Another preferred method of the invention is shown by the flowchart in FIG. 9. In step 60, the method monitors vehicle conditions to determine when the vehicle is entering a user's garage. While the vehicle is entering the garage, a parking mode begins with a check in step 61 to determine whether the vehicle has moved to a position which clears the vehicle profile from the garage door pathway. If a fully cleared position is achieved, then no further monitoring is needed and the method ends at step 62. Otherwise, until the vehicle progresses to a position where no interference occurs between the garage door path and the vehicle profile, the method provides guidance notifications via an HMI to the driver in step 63. For example, graphical icons depicting the vehicle position versus a desired position may be successively shown on a display screen or text messages can be utilized. A check is performed in step 64 to determine whether the driver has shifted the vehicle transmission into the Park position. If not, then the parking mode continues to check for a cleared position in step 61.

Upon shifting into the park position in step 64, the method switches to a parked mode. In step 65, an alert modification informing the driver that a cleared position has not been achieved is escalated in step 65. In other words, an urgency of the messaging is increased by adding audio cues, enlarging or flashing a text message or graphics on a display screen, and/or generating additional messages using a different HMI device. Since the vehicle has not yet been switched off, it may still be relatively easy for the driver to reengage the transmission and continue to move the vehicle to a parking location that achieves a non-interfering position. A check is performed in step 66 to determine whether the driver has turned off the vehicle (e.g., by switching the ignition state to Off). If the vehicle has not been switched off, then a delay is implemented by hooping through a delay step 67. The delay results in continuing the alert notification for a predetermined period of time (e.g., 5 min). If the driver has turned off the vehicle, then a check is performed in step 68 to determine whether the driver door is ajar (i.e., has been opened). If not, then a five-minute looping delay is implemented using a delay step 69. Once the driver door has opened (thereby indicating that the driver is exiting the vehicle), a final alert notification is generated in step 70 using a highest urgency to reinforce to the driver that an interfering position exists between the vehicle profile and the garage door pathway. If at some point the vehicle is restarted and/or the transmission is shifted back into gear to refine the parking position, then the method returns to step 61 (not shown).

Once the driver has exited the vehicle and the final escalated alert notification has been provided in step 70, the parked mode monitors for a garage door closure event in step 71 (e.g., using audio detection and/or image processing as discussed above). In order to avoid excessive power drain on the vehicle battery, operation of the parked mode may be limited to a predetermined length of time following shutdown of the vehicle. Therefore, when a closure event has not been detected in step 71 then a looping delay is executed via step 72 (e.g., for 10 min). If a closure event is not detected by the end of the delay period, then the invention may cease operation. When closure event is detected in step 71, then a remote actuation command is sent to a garage door actuator in step 73 in order to reverse the closing action of the garage door (provided the vehicle has a garage door transmitter built-in). After reversing the garage door actuator, a garage door reversal notification is sent to the user in step 74 and the method ends at step 62.

What is claimed is:

1. A driver assistance method comprising:
   remote scanning around a vehicle to detect a path of a garage door;
   in a parking mode, comparing the path to a vehicle profile and providing a driver guidance to locate the vehicle where the profile and path are non-interfering, wherein the vehicle profile encompasses an expansion zone recurrently occupied by a powered door of the vehicle;
   in a parked mode, 1) monitoring a closure state of the powered door; 2) monitoring the garage door and commanding a garage door actuator to reverse if the actuator is closing the garage door toward an interfering position with the profile;
   wherein if the interfering position coincides only with the expansion zone then the actuator is reversed in the parked mode only if the closure state indicates that the powered door is not closed.

2. The method of claim 1 wherein closing of the garage door is detected in response to a manual activation of the garage door remote controller in the vehicle.

3. The method of claim 1 wherein a microphone is mounted in the vehicle for detecting sounds in a vicinity of the vehicle, the method further comprising:
   comparing the detected sounds to a predetermined sound signature to detect closing of the garage door.

4. The method of claim 1 wherein a camera is mounted on the vehicle having a field of view outside the vehicle, the method further comprising:
   tracking a moving edge of the garage door in the field of view to detect closing of the garage door.

5. The method of claim 1 wherein a microphone is mounted in the vehicle for detecting sounds in a vicinity of the vehicle and wherein a camera is mounted on the vehicle having a field of view outside the vehicle, the method further comprising:
   comparing the detected sounds to a predetermined sound signature to detect actuation of the garage door; and
   tracking a moving edge of the garage door in the field of view to detect a direction of actuation of the garage door.

6. The method of claim 1 further comprising the step of displaying an alert message to a user to announce that the actuator was reversed.

7. A road vehicle comprising:
- a remote sensor configured to scan a region outside the vehicle to detect a garage door path relative to the vehicle;
- a human machine interface (HMI) configured to provide messages to a user;
- a controller having 1) a parking mode which compares the garage door path to a vehicle profile wherein the vehicle profile encompasses an expansion zone recurrently occupied by a powered door of the vehicle and 2) a parked mode which monitors a closure state of the garage door; and
- a garage door remote controller configured to transmit actuation commands to a predetermined garage door opener;
- wherein, during the parking mode, the controller initiates navigation messages via the HMI to assist the user in moving the vehicle to a location where the profile and the garage door path are non-interfering;
- wherein, during the parked mode, the controller initiates an actuation command if the closure state indicates that a garage door closing along the garage door path is approaching an interfering position with the vehicle profile; and
- wherein the controller monitors a closure state of the powered door, and wherein if the interfering position coincides only with the expansion zone then the controller initiates the actuation command only if the closure state indicates that the powered door is not closed.

8. The vehicle of claim 7 wherein closing of the garage door is detected in response to a manual activation of the garage door remote controller.

9. The vehicle of claim 7 further comprising:
- a microphone mounted to the vehicle for detecting sounds in a vicinity of the vehicle;
- wherein closing of the garage door is detected in response to comparing the detected sounds to a predetermined sound signature.

10. The vehicle of claim 7:
- wherein the remote sensor is comprised of a camera having a field of view outside the vehicle; and
- wherein closing of the garage door is detected in response to detecting the garage door in the field of view of the camera.

* * * * *